Jan. 22, 1957 W. SHORR 2,778,754
ELECTRODE FILMS FOR MINIATURE OR HIGH RATE BATTERIES
Filed Aug. 3, 1954
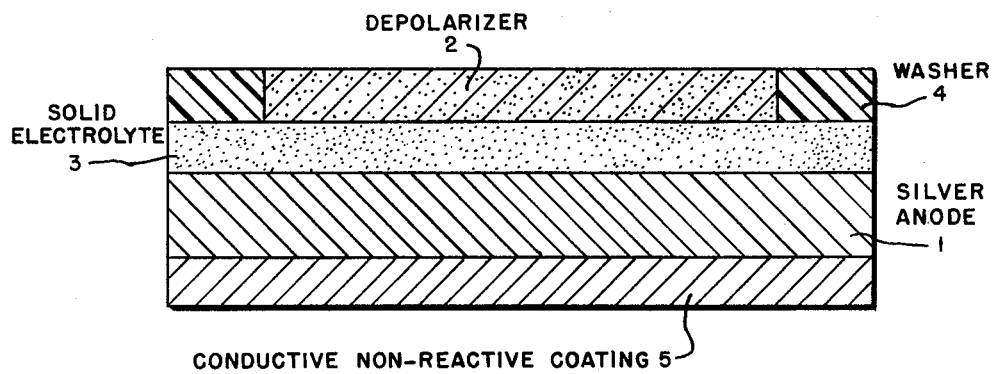
*INVENTOR.*
WILLIAM SHORR
BY *Harry M. Saragovitz*
*ATTORNEY*

United States Patent Office 2,778,754
Patented Jan. 22, 1957

2,778,754
ELECTRODE FILMS FOR MINIATURE OR HIGH RATE BATTERIES

William Shorr, Little Silver, N. J., assignor to the United States of America as represented by the Secretary of the Army Application August 3, 1954, Serial No. 447,686

4 Claims. (Cl. 136—137)

(Granted under Title 35, U. S. Code (1952), sec. 266)

The invention described herein may be manufactured and used by or for the Government for governmental purposes without the payment of any royalty thereon.

This invention relates to methods of forming extremely thin electrode films for special purpose batteries to be used as power sources in such applications as guided missiles, portable radio sets, radiosondes, etc. The miniaturization of such batteries, particularly if high potentials are required necessitate the application of so-called wafer cells, that is, dry cells of the flat type in which the elements are in the form of very thin, flat sheets or plates.

One of the chief problems associated with the manufacture of wafer type cells lies in the formation of a thin depolarizer electrode. No difficulties are usually encountered in the mass production of thin negative electrodes since the anodic metal such as zinc, cadmium, etc., may be easily and economically fabricated in extremely thin sheets. However, the depolarizer material of the positive electrode, consisting usually of a pasty mixture of such oxides as manganese peroxide, silver peroxide, mercuric oxide, etc., together with conductive powders such as graphite, carbon black, etc., does not lend itself to mass production methods if extremely thin flat layers of such materials are to be formed.

The invention is based on the discovery that film forming plastic materials, particularly film forming high polymers, and more particularly, elastomers, such as polyvinyl chloride may be used to great advantage for the economic mass production of very thin depolarizer electrodes by mixing the depolarizer material into a solution of the film forming plastic material and casting this mixture onto a flat plate or dish so as to form a very fine film. After allowing the solvents to evaporate a film of about 1 to 10 mils thickness may be obtained which contains sufficient depolarizer material to function as depolarizer electrode in a wafer type cell.

The invention will become more apparent from the following description of specific embodiments of the broad inventive idea.

While the electrode films made according to the invention may be used for the manufacture of positive and negative electrodes in conjunction with various electrochemical systems, the outstanding advantages of such electrode films will become particularly apparent in considering their applications to systems which use a solid crystalline electrolyte as described, for instance, in United States Patent No. 2,690,465.

The drawing represents a cell using such solid electrolyte systems comprising, for instance, silver/silver iodide/iodine. The use of such cells in pile type batteries is disclosed in another copending patent application Serial No. 453,975, filed September 2, 1954, by Andrew J. Hack, Stuart J. Shapiro, and William Shorr.

The cell shown in the drawing is greatly enlarged and consists of a negative silver anode 1, a depolarizer anode 2 comprising iodine as the depolarizing material and a solid crystalline electrolyte 3 consisting of silver iodide which is a good ionic conductor but shows little or no electronic activity.

The conductive layer 5 consists of a metal (preferably tantalum, molybdenum, or a conductive plastic) which does not react with either the silver anode or the depolarizer material. This layer 5 establishes the electrical contact between the silver anode of one cell and the depolarizer cathode of the neighboring cell. Insulating washers 4 made of Bakelite, Teflon, or the like, peripherally surrounding the depolarizer electrode, prevent leakage currents from one cell to the other. A large number of such cells are stacked, for instance, in a glass or polystyrene tubing of appropriate length and close fitting diameter. Sufficient pressure is applied to insure good physical contact between the cells and the open ends of the tubing are sealed with a suitable potting or sealing compound after the necessary terminals are connected to the depolarizer electrode of one end cell and the conductive coating of the opposite end cell.

The above-described pile type batteries are used for special purpose applications as miniaturized high rate batteries and may consist of a very large number (e. g., one hundred or more) of individual cells of about ½" in diameter, each cell having a thickness of about 2.2 to 20 mils thickness. The thicknesses of the cell elements are usually about 1 to 5 mils for the depolarizer, about 1.1 to 2 mils for the solid electrolyte, about 1 to 10 mils for the silver anode and about 1.1 to 3 mils for the conductive nonreactive coating.

As already mentioned, no special difficulties are encountered in the mass production of the elements of such miniaturized cells except for the manufacture of the depolarizer cathode. However, very satisfactory results may be obtained if the mass production of such cathodes is carried out according to the present invention in the manner exemplified by the following description of a new method of making a cathode film of about 5 mils thickness for the above-mentioned system containing a high proportion of iodine.

Twenty-five mils of a 25% dispersion of an elastomeric high polymer (e. g., Koroseal) is thoroughly mixed with 10 grams of finely divided graphite or carbon black. To this mixture are added 25 mls of a solution of 10 to 20 grams of pulverized iodine in an organic solvent, for instance, methyl ethyl ketone. The organic solvent used for the dispersion of the elastomer and the organic solvent used for the iodine should be mutually compatible to prevent coagulation of the elastomer from its dispersion or precipitation of the iodine from its solution. The mixture of the two liquids are then well dispersed by stirring or by putting it through a colloid mill. The final mixture is then poured onto the flat surface of a plate of glass or any other material which is inert to iodine. The plate may be slightly inclined and the resulting thin film is then air dried. When thoroughly dried the film may be rolled lightly to reduce it to the desired thickness. The dried and rolled film may then be cut or punched into discs or strips of any desired size or shape and then used as cathode film in wafer type cells as shown in the drawing.

The methods of electrode film formation according to the present invention may be readily adapted to most other cell systems such as Zn/KOH/HgO, $Zn/KOH/Ag_2O_2$, $Mg/H_2OCu_2Cl_2$, $Zn/ZnCl_2$ plus $NH_4Cl/MnO_2$ as well as to solid electrolyte systems, other than those mentioned above.

The method of the present invention may also be employed to great advantage to the mass production of anode films by dispersing the anodic metal in powder form in a film forming solution of an appropriate high polymer, and casting the mixture onto a flat surface so as to form a very fine electrode film in the manner described.

Cells having very large electrode areas may be easily achieved with the electrode films made according to the present invention by winding or rolling strips of such anode and cathode films together (properly backed by some conductive strip and separated by an electrolyte absorbent separator) into a concentric roll of any desired diameter. The techniques of assembling such cells into coil form are well known in the art.

The electrode films made according to the present invention may be used in both reserve and nonreserve type batteries.

It will be understood by those skilled in the art that a great number of variations and combinations are possible within the scope of the inventive idea as characterized in the accompanying claims.

What is claimed is:

1. Method of making an iodine depolarizer electrode for miniaturized high rate batteries using the system silver/solid crystalline electrolyte/iodine comprising mixing a solution of iodine in an organic solvent with a film forming liquid containing a dispersion of an elastomer in an organic solvent and a finely divided electrically conductive inert material, casting said mixture on to the surface of a flat plate so as to obtain a thin coating which after evaporation of the solvent forms a film of about 1 to 10 mils thickness and stripping the dried film from the plate.

2. Method of making a cathode film according to claim 1 in which the film forming liquid comprises polyvinyl chloride.

3. A cathode film for miniaturized high rate batteries using iodine as the cathode material comprising a film of an insulating plastic material having dispersed therein a mixture of finely divided iodine and finely divided electrically conductive, nonreactive materials.

4. A cathode film according to claim 3 in which the insulating plastic material comprises polyvinyl chloride.

References Cited in the file of this patent

UNITED STATES PATENTS

| | | |
|---|---|---|
| 2,649,492 | Linton et al. | Aug. 18, 1953 |
| 2,690,465 | Broder | Sept. 28, 1954 |